(12) United States Patent
Kimes et al.

(10) Patent No.: US 8,491,440 B2
(45) Date of Patent: Jul. 23, 2013

(54) PLANETARY PINION CARRIER AND ONE-WAY CLUTCH

(75) Inventors: John W. Kimes, Wayne, MI (US); Mark W. Rosselot, Saline, MI (US); Gregory D. Goleski, Clarkston, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1018 days.

(21) Appl. No.: 12/575,529

(22) Filed: Oct. 8, 2009

(65) Prior Publication Data

US 2010/0029435 A1 Feb. 4, 2010

Related U.S. Application Data

(63) Continuation of application No. 11/701,663, filed on Feb. 2, 2007, now Pat. No. 7,654,929.

(51) Int. Cl.
*F16H 3/44* (2006.01)

(52) U.S. Cl.
USPC ............................ 475/324; 475/325; 475/340

(58) Field of Classification Search
USPC ................ 475/331, 323, 324, 325, 338, 339, 475/340; 192/48.92, 48.3
See application file for complete search history.

(56) References Cited

U.S. PATENT DOCUMENTS

| | | | |
|---|---|---|---|
| 3,407,686 A * | 10/1968 | Tuck et al. | 475/39 |
| 4,129,050 A | 12/1978 | Akashi et al. | |
| 4,615,231 A * | 10/1986 | Takahashi | 74/467 |
| 4,721,014 A | 1/1988 | Ohkubo | |
| 4,774,857 A | 10/1988 | Heine et al. | |
| 4,930,610 A | 6/1990 | Akai et al. | |
| 5,086,668 A | 2/1992 | Fujiwara et al. | |
| 5,715,918 A | 2/1998 | Everett et al. | |
| 5,746,675 A * | 5/1998 | Sugiyama | 475/278 |
| 2001/0012808 A1 | 8/2001 | Tajima et al. | |
| 2001/0039228 A1 | 11/2001 | Eulenstein et al. | |
| 2004/0062673 A1 | 4/2004 | Trasorras et al. | |
| 2004/0116226 A1 | 6/2004 | Baker et al. | |
| 2005/0279602 A1 | 12/2005 | Ruth | |
| 2006/0089228 A1 | 4/2006 | Nakagawa et al. | |

FOREIGN PATENT DOCUMENTS

| | | |
|---|---|---|
| GB | 2411443 A | 8/2005 |
| GB | 2424048 A | 9/2006 |

* cited by examiner

*Primary Examiner* — Justin Holmes
(74) *Attorney, Agent, or Firm* — James Dottavio; MacMillan, Sobankski & Todd, LLC

(57) ABSTRACT

A transmission gear unit includes a carrier including a first disc formed with a first chamfer, and a second disc, a one-way clutch including a first ring contacting the second disc, and a second ring, located radially outboard of and surrounding the first ring, and formed with a second chamfer, and pinion shafts, each shaft supported on the first disc and first ring, engaging the first and second chamfers and supporting a pinion thereon.

13 Claims, 3 Drawing Sheets

PLANETARY PINION CARRIER AND ONE-WAY CLUTCH

This application is a continuation of U.S. application Ser. No. 11/701,663, filed Feb. 2, 2007.

BACKGROUND OF THE INVENTION

1. Field of the Invention

This invention relates generally to a planetary gear unit for an automatic transmission, and more particularly to an assembly that includes a planet pinion carrier connected to a powdered metal plate of a one-way clutch.

2. Description of the Prior Art

A conventional Ravigneaux gearset includes a carrier containing two sets of planet pinions, long pinions and short pinions. Each pinion set includes several pinions. Each pinion is mutually spaced angularly about a central axis, each short pinion meshing with a corresponding long pinion. There are two sun gears, a short sun gear meshing with the short pinions, and a long sun gear meshing with the long pinions. A ring gear meshes with the long pinions.

Both planet pinion sets are supported for rotation on the carrier. Each long pinion is in mesh with a short pinion, the ring gear, and the long sun gear. Each short pinion is in mesh with a long pinion and the short sun gear.

Ravigneaux gearsets are used in many automatic transmissions due to their compact size. A Ravigneaux gearset can be used in lieu of two simple planetary gearsets to produce four forward speeds and a reverse gear. They are smaller, and require fewer components than two simple planetary gearsets because they have one ring gear, and one carrier. Their manufacturing and assembly costs compare favorably to those of simple planetary gearsets.

Frequently a Ravigneaux gear unit is controlled by a hydraulically actuated friction brake, which alternately holds the carrier against rotation on a transmission casing and releases the carrier to rotate freely. A one-way clutch is often arranged in parallel with the friction brake between the casing and planet carrier. The rings of the one-way clutch are formed from powdered metal, but the other components of the carrier assembly are machined from cast iron. There is a need to integrate such one-way clutches into the carrier assembly using mechanical connections. But the components of the integrated assembly that are fabricated from powdered metal and those that are fabricated from cast iron have substantially different material stiffness and strength properties. For example, pinion carriers are less expensive, more rigid and have better pinion window tolerances when made from cast iron than from powdered metal.

The joint between a cast iron carrier and a powder metal clutch ring must radially locate both parts, axially retain both parts, and carry torque. Conventional methods for joining the two dissimilar materials include a spline and a snap ring, but these require excessive axial space; a shearing spline, which would create high radial loads on the thin powder metal clutch ring; or a press fit, which would not carry the high loading.

There is a need in the automatic transmission industry for an integrated carrier assembly comprising both a one-way clutch of powder metal and other components of machined cast iron that overcomes these and other problems associated with integrating and mechanically joining the dissimilar metals.

SUMMARY OF THE INVENTION

A transmission gear unit includes a carrier including a first disc formed with a first chamfer, and a second disc, a one-way clutch including a first ring contacting the second disc, and a second ring, located radially outboard of and surrounding the first ring, and formed with a second chamfer, and pinion shafts, each shaft supported on the first disc and first ring, engaging the first and second chamfers and supporting a pinion thereon.

The joint between a cast iron carrier and a powder metal clutch ring must radially locate both parts, axially retain both parts, and carry torque. The method accurately machines a radial pilot in both the carrier and the one-way clutch ring to locate the two parts radially. The method provides unmachined clearance holes in the clutch ring, which holes correspond with the long pinion shafts in the carrier assembly to carry the torque. After the clutch ring and clutch rocker assembly is installed over the long pinion shafts, the pinion shafts are orbital formed or riveted to fill the hole clearance and retain the rocker assembly axially.

Advantages provided by the invention include excellent radial location for the clutch ring to the carrier, the clutch ring is removed from the pinion stack path, thereby improving pinion window tolerances, it requires no additional axial space, as compared to a powdered metal rocker and conventional carrier assembly, and the one-way clutch is completely removable, thereby allowing flexibility for cost vs. shift quality across different vehicle platforms.

By splitting the powder metal rocker clutch cam ring from the cast iron carrier, an original equipment manufacturer (OEM) can source manufacture of the planet carrier separately from manufacture of the rocker one-way clutch components. In this way, the OEM can assemble the rocker one-way clutch assembly, or have a supplier assemble the one-way clutch and ship it to the OEM ready to install on the planet carrier. By splitting the rocker clutch cam ring from the planet carrier, an OEM can employ business entities proficient in powdered metal fabrication to manufacture the one-way clutch and entities proficient in fabricating machined castings for the pinion carrier.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

These and other advantages will become readily apparent to those skilled in the art from the following detailed description of a preferred embodiment when considered in the light of the accompanying drawings in which.

DESCRIPTION OF THE PREFERRED EMBODIMENT

Figure 1:
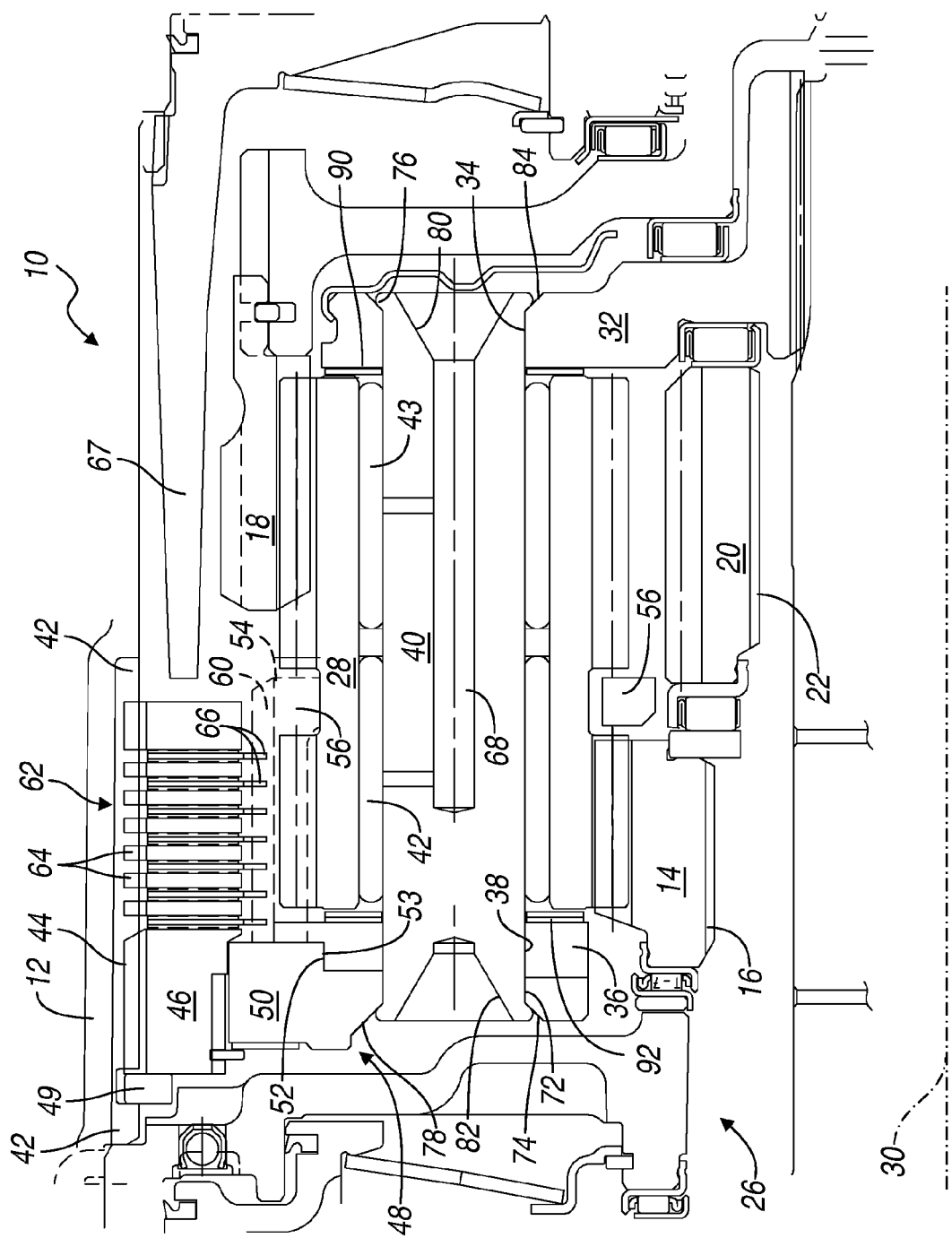
FIG. 1 is a side cross section of a Ravigneaux gear set for an automatic transmission.
Figure 2:
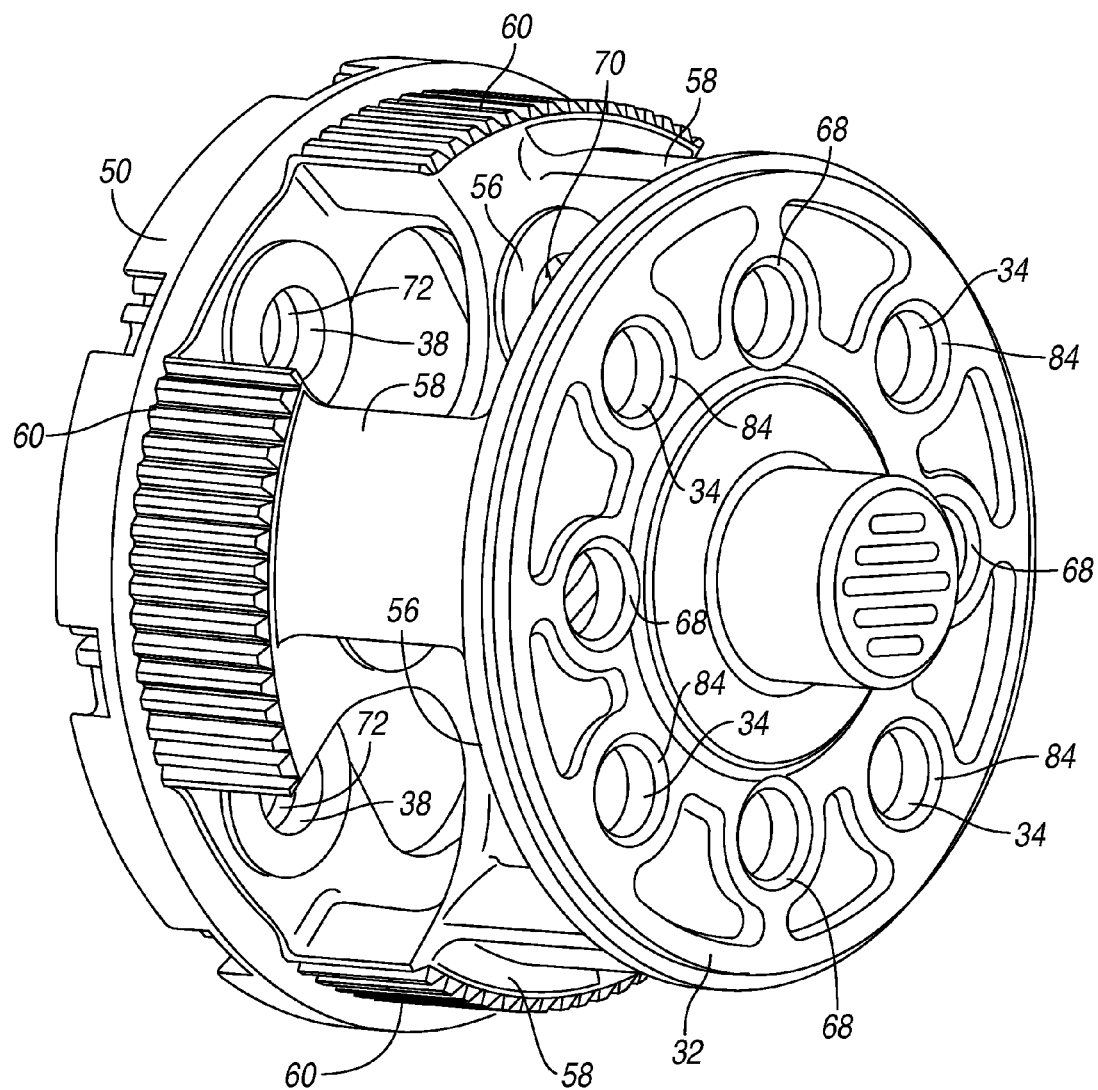
FIG. 2 is a front-side perspective view of the carrier assembly shown in FIG. 1.
Figure 3:
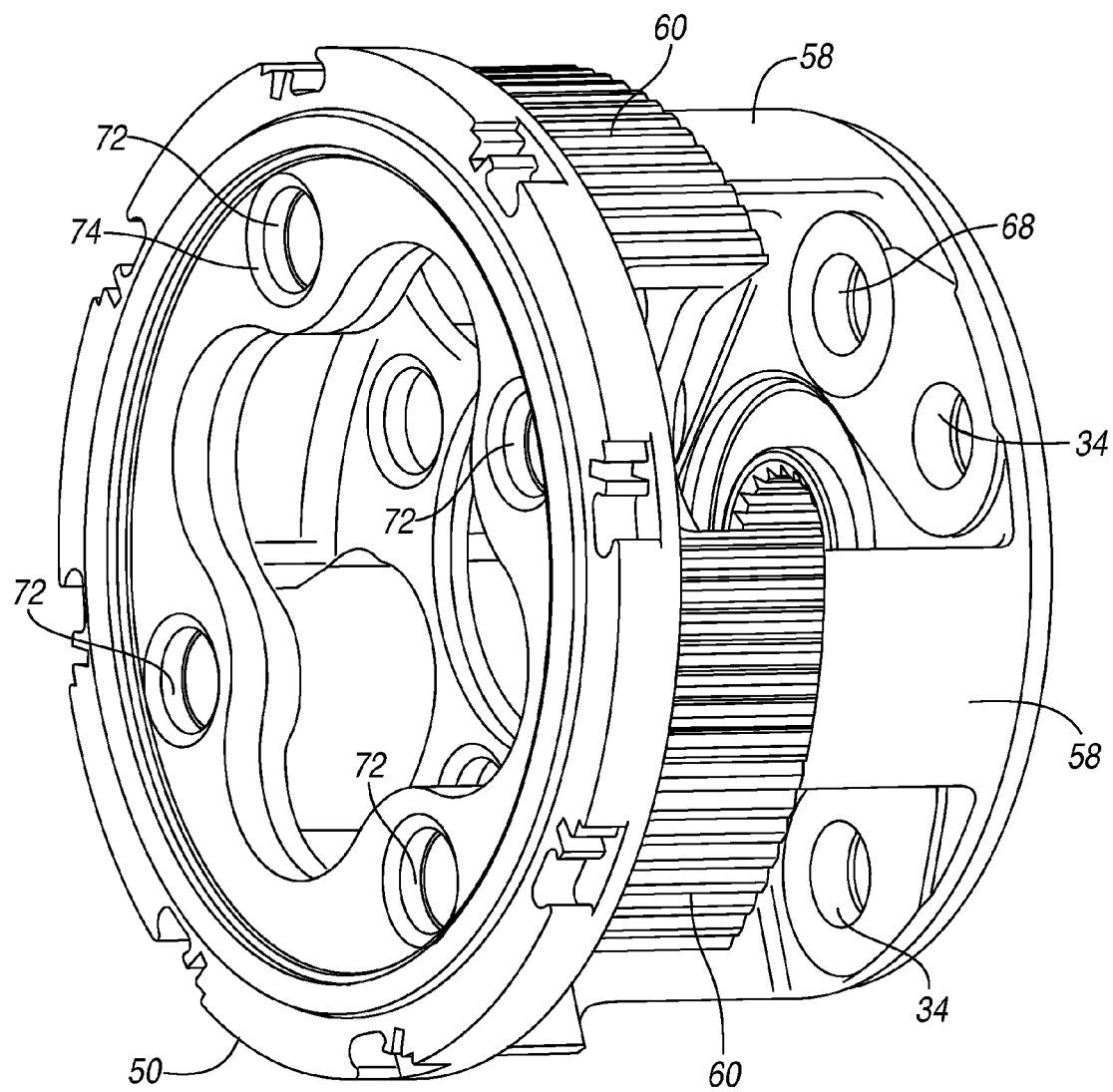
FIG. 3 is a rear-side perspective view of the carrier assembly shown in FIG. 1.

Referring to FIGS. 1-3, a planetary gear assembly 10 of the Ravigneaux type located in a transmission case 12 includes a first sun gear 14, connected by a spline 16 to a rotating shaft;

a second sun gear 20, connected by a spline 22 to a rotating shaft; a planet pinion carrier assembly 26, which is supported for rotation and includes long planet pinions 28, each spaced angularly about an longitudinal axis 30, supported on the carrier 26 and meshing with sun gear 14. The gear assembly 10 includes a set of short planet pinions (not shown), each spaced angularly about axis 30, supported on carrier 26 and meshing with sun gear 20 and a long pinion 28. The gear assembly 10 further includes a ring gear 18 surrounding the long pinions 28, short pinions and sun gears 14, 20 and engaged with the long pinions 28.

The carrier assembly 26 includes a first disc 32 formed with axial holes 34 spaced angularly about axis 30 joined to a second disc 36 spaced axially from the first disc and formed with axial holes 38, each second hole being aligned a first hole 34; and pinion shafts 40 each supported on the carrier 26 and extending axially through a first hole 34 and a second hole 38. Discs 32 and 36 are formed integrally as a unitary component, preferably as a casting of cast iron. Bearings 42, 43, fitted between the outer surface of each pinion shaft 40 and the inner surface of a corresponding long pinion 28, support the long pinions 28 in rotation on the pinion shafts 40.

The transmission case 12 is formed at an inner surface with axial spline teeth 42, which are engaged with external spline teeth 44 formed on the circumferential periphery of the outer ring 46 of a rocker one-way clutch 48. The outer ring 46 of one-way clutch 48 is secured to the case 12 by a snap ring 49. An inner ring 50 of clutch 48 is guided to its correct radial position on a pilot surface 52 formed on carrier disc 36.

Carrier 26 includes a member 54 having a web 56 located axially between axial spaced portions of the long pinion 40. Member 54 further includes posts 58, which encircle the short pinions and long pinions 40, and axial external spline teeth 60, which are angularly spaced about axis 30, aligned with posts 58 and offset angularly from the pinion shafts 40 and long pinions 28. An axial end of member 54 bears against the clutch ring 50 and the opposite axial end of member 54 bears against the carrier disc 32. FIG. 2 shows that the web provides spaces into which pinions 28 and pinion shafts 40 are located.

A hydraulically actuated friction brake 62 includes clutch plates 64, which are spaced mutually and rotatably secured to the case 12 by engagement with spline teeth 42. Frictions discs 66, each interleaved between successive clutch plates 64, are rotatably secured to the member 54 by engagement with its spline teeth 60. A hydraulically actuated brake piston 67 produces a drive connection between the case 12 and carrier 26 when it moves leftward, thereby forcing the plates 64 and discs 66 into mutual frictional contact against the outer ring 46 of one-way clutch 48.

FIG. 2 shows angularly spaced holes 68 formed in carrier disc 32 and angularly spaced holes 70 formed in web 54 and aligned with holes 68. The short pinions are supported in rotation on short pinion shafts (not shown) located in holes 68 and 70. The short pinion shafts secure member 54 to carrier 26 for rotation as a unit due to the short pinion shafts being fitted through holes 68 and 70.

The mechanical connection that joins the cast iron carrier 26 and the powder metal clutch ring 50 must locate both parts radially, axially secure the parts mutually, and transmit torque about axis 30. To accomplish these, mating radial pilot surfaces 52 are accurately machined in both carrier disc 36 and clutch ring 50, thereby locating disc 36 and ring 50 at their correct radial positions. Unmachined clearance holes 72 having chamfered surfaces 74 are formed in the clutch ring 50. The mutually aligned holes 38, 34 in the carrier discs 32, 36 receive the long pinion shafts 40 of the Ravigneaux carrier assembly 26, and allow a portion of each pinion shaft to extend axially through holes 38 and into a hole 72 in the clutch ring 50. After the clutch ring 50 is installed over the pilot 52 and over the long pinion shafts 40, the pinion shafts are orbital formed or riveted into holes 72, thereby retaining the components of the rocker assembly 26, including clutch ring 50, in their correct axial positions. FIG. 1 shows that orbital forming the pinion shafts 40 peens material 76, 78 located at the outer periphery of countersunk, conical holes 80, 82 in the pinion shafts over chamfered surfaces 74, 86 in the opposite ends of the pinion shafts 40.

A method for assembling the planetary gear unit includes (a) pre-assembling each long pinion gear 28 with bearings 42 and 43 and washers 90 and 92 into the carrier assembly 26; (b) installing a pinion shaft 40 through hole 38 and through the long pinion gear 28 with bearings 42 and 43 and washers 90 and 92 and then through hole 34 with each pinion shaft 40 extending past the first disc through hole 38; (c) forming the first disc with a first pilot surface 52 radially spaced from the axis and extending along the axis. The first ring 50 is formed with a second pilot surface 53 substantially parallel to the first pilot surface. The second pilot surface 53 is engaged with the first pilot surface 52 while installing the first ring 50. The outer clutch ring 46 is installed and aligned axially with the first ring and located radially outboard of the first clutch ring 50. Then (d) the pinion shafts 40 are orbital formed or riveted to axially retain the first ring 50 to the carrier assembly 26 and to prevent the pinion shafts 40 from moving axially relative to carrier assembly 26.

In accordance with the provisions of the patent statutes, the preferred embodiment has been described. However, it should be noted that the alternate embodiments can be practiced otherwise than as specifically illustrated and described.

What is claimed is:

1. A transmission apparatus, comprising:
   a carrier including a first disc formed with a first chamfer, and a second disc;
   a one-way clutch including a first ring contacting the second disc, a second ring encircling the first ring, and a second chamfer;
   a pinion shaft secured directly to the first disc and the first ring by engaging the first and second chamfers.

2. The apparatus of claim 1, wherein:
   the second disc includes a first pilot surface spaced radially from and extending along an axis; and
   wherein the first ring includes a second pilot surface located adjacent the first pilot surface and extending along the axis.

3. The apparatus of claim 1, wherein the carrier includes first spline teeth extending along an axis, and further comprising:
   clutch discs engaged with the first spline teeth, each disc being spaced mutually along the axis;
   a casing formed with second spline teeth; and
   clutch plates, each clutch plate located between successive clutch discs and engaged with the second spline teeth, movement of the clutch plates and discs along the axis limited by the second ring.

4. The apparatus of claim 1 wherein:
   the first disc has first holes, each first hole formed with the first chamfer, inclined radially outward and along an axis;
   the first ring has second holes, each second hole formed with the second chamfer, inclined radially outward and along the axis;
   pinion shafts, each pinion shaft includes a first portion that extends axially through one of the first holes, and a second portion that extends axially through one of the second holes, each first portion in loaded contact with the first chamfer surface, each second portion in loaded contact with the second chamfer surface.

5. The apparatus of claim 2 wherein the first disc and second disc are formed integrally as a unitary cast component whose material is cast iron.

6. A transmission apparatus, comprising:
a carrier including a first disc having first holes surrounded by a first chamfer, a first pilot extending along an axis, and a second disc secure to and spaced from the first disc and having second holes;
a one-way clutch including a first ring including a second pilot engaging the first pilot and having third holes surrounded by a second chamfer, and a second ring located radially outward from the first ring;
pinion shafts, each pinion shaft extending axially through one of the first holes, one of the second holes and one of the third holes, and secured directly to the first disc and the first ring by engaging the first and second chamfers.

7. The apparatus of claim 6 wherein the second ring is aligned axially with and located radially outboard of the first ring, and the carrier formed with first spline teeth; and further comprising:
clutch discs including second spline teeth engaged with the first spline teeth; and
clutch plates, each clutch plate being located between successive clutch discs, movement of the clutch plates and clutch discs along the axis being limited by the second ring.

8. The apparatus of claim 6 wherein the second ring is aligned axially with and located radially outboard of the first ring, and the carrier is formed with first spline teeth; and further comprising:
clutch discs are engaged with the first spline teeth;
a casing formed with second spline teeth surrounding the first spline teeth, extending along the axis, and radially spaced from the first spline teeth; and
clutch plates, each clutch plate being located between successive clutch discs and engaged with the second spline teeth, movement of the clutch plates and clutch discs along the axis being limited by the second ring.

9. A transmission apparatus, comprising:
a carrier including a first disc, a first pilot extending along an axis, and a second disc;
a one-way clutch including a first ring including a second pilot engaging the first pilot, and a second ring encircling the first ring;
pinion shafts, each shaft secured directly to the first disc and first ring.

10. The apparatus of claim 9 wherein the first disc is formed with a first chamfer, the first ring is formed with a second chamfer, and each shaft engages the first and second chamfers.

11. The apparatus of claim 9 wherein the carrier includes first spline teeth extending along the axis, and further comprising:
clutch discs engaged with the first spline teeth, each disc being spaced mutually along the axis;
a casing formed with second spline teeth; and
clutch plates, each clutch plate located between successive clutch discs and engaged with the second spline teeth, movement of the clutch plates and discs along the axis limited by the second ring.

12. The apparatus of claim 9 wherein:
the first disc has first holes, each first hole formed with the first chamfer inclined radially outward and along the axis;
the first ring has second holes, each second hole formed with the second chamfer, inclined radially outward and along the axis;
each pinion shaft includes a first portion that extends axially through a first hole, and a second portion that extends axially through a second hole, each a first portion in loaded contact with the first chamfer surface, each second portion in loaded contact with the second chamfer surface.

13. The apparatus of claim 9 wherein the first disc and second disc are formed integrally as a unitary cast component whose material is cast iron.

* * * * *